(12) United States Patent
Yamazaki et al.

(10) Patent No.: US 7,639,910 B2
(45) Date of Patent: Dec. 29, 2009

(54) OPTICAL MODULE AND METHOD OF PACKAGING THE SAME

(75) Inventors: Hiroyuki Yamazaki, Tokyo (JP); Takaaki Hatanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/759,128

(22) Filed: Jun. 6, 2007

(65) Prior Publication Data

US 2007/0291364 A1 Dec. 20, 2007

(30) Foreign Application Priority Data

Jun. 20, 2006 (JP) .............................. 2006-170388

(51) Int. Cl.
*G02B 6/26* (2006.01)
*G02B 6/00* (2006.01)
*G02B 6/12* (2006.01)
*G02B 6/28* (2006.01)
*G02B 6/32* (2006.01)
*G02F 1/295* (2006.01)
*H04J 14/00* (2006.01)
*H04J 14/02* (2006.01)
*H04J 10/00* (2006.01)
*G02F 1/00* (2006.01)
*G02F 1/01* (2006.01)
*G02F 1/23* (2006.01)
*G02F 1/09* (2006.01)
*G02F 1/11* (2006.01)
*H01S 3/10* (2006.01)
*H01S 3/13* (2006.01)
*H01S 3/08* (2006.01)

(52) U.S. Cl. .................. 385/32; 385/4; 385/5; 385/11; 385/13; 385/14; 385/15; 385/16; 385/17; 385/18; 385/19; 385/20; 385/21; 385/22; 385/23; 385/24; 385/27; 385/30; 385/31; 385/33; 385/39; 385/40; 385/50; 385/51; 385/52; 398/68; 398/79; 398/85; 398/176; 359/237; 359/276; 359/278; 359/284; 359/285; 359/286; 359/287; 359/288; 359/289; 359/308; 359/590; 372/26; 372/28; 372/31; 372/32; 372/92

(58) Field of Classification Search ................ 385/1–3, 385/13–24, 30–33, 50–52, 4, 5, 11, 27, 39, 385/40; 398/68, 79, 85, 176; 359/115, 124, 359/237, 276, 284–289, 308, 278, 590; 372/26, 372/28, 31, 32, 92
See application file for complete search history.

(56) References Cited

U.S. PATENT DOCUMENTS

| | | | |
|---|---|---|---|
| 5,305,134 A * | 4/1994 | Tsushima et al. ............. 398/91 |
| 5,896,211 A * | 4/1999 | Watanabe ..................... 398/76 |
| 6,316,281 B1 | 11/2001 | Lee et al. |
| 6,445,837 B1 | 9/2002 | Hatami Hanza |
| 6,473,214 B1 * | 10/2002 | Roberts et al. .............. 398/183 |
| 6,819,666 B2 * | 11/2004 | Chang et al. ................. 370/352 |
| 6,963,685 B2 | 11/2005 | Mahgerefteh et al. |
| 7,260,279 B2 * | 8/2007 | Gunn et al. ..................... 385/2 |
| 2003/0118294 A1 * | 6/2003 | Korenaga et al. ............. 385/92 |
| 2003/0235367 A1 * | 12/2003 | Yamazaki ..................... 385/39 |
| 2004/0136647 A1 * | 7/2004 | Mizuno et al. ................. 385/24 |
| 2004/0165826 A1 * | 8/2004 | Wessel ....................... 385/40 |
| 2005/0175356 A1 | 8/2005 | McCallion et al. |
| 2006/0153267 A1 * | 7/2006 | Suzuki et al. ................. 372/92 |

FOREIGN PATENT DOCUMENTS

EP 1786121 A1 5/2007
KR 2003-62111 A 7/2003
WO WO 2006/028531 A2 3/2006

OTHER PUBLICATIONS

Yasuhiro Matsui et al. "Chirp-Managed Directly Modulated Laser (CML)", IEEE Photonics Technology Letters, vol. 18, No. 2, Jan. 15, 2006.

D. Mahgerefteh et al. "Error-Free 250Km Transmission in Standard Fibre Using Compact 10 Gbit/s Chirp-Managed Directly Modulated Lasers (CML) at 1550nm", Electronics Letters, 28$^{th}$ Apr. 2005, vol. 41, No. 9.

Roeloffzen C G H; et al, "Passband-flattened periodic multi/demultiplexer using a Mach-Zehnder interferometer with ring resonator fabricated in SiON waveguide technology", Proceeding of the SPIE, SPIE, Bellingham, VA, US, vol. 4947, p. 84-9, 2003-00-00.

M.S. Cohen et al., "Improvements in Index Alignment Method for Laser-Fiber Array Packaging" 43rd Electronic Components and Technology Conference, Paper C-291, 1993, pp. 808-817, IEICE;

* cited by examiner

*Primary Examiner*—Charlie Peng
*Assistant Examiner*—Hung Lam
(74) *Attorney, Agent, or Firm*—Sughrue Mion, PLLC

(57) ABSTRACT

An optical module is configured with a combination of a single-mode oscillating light source and an optical filter. In this optical module, the single-mode oscillating light source outputs a single-mode, frequency-modulated signal. Further, the optical filter converts the frequency modulation to an amplitude modulation. And, the single-mode oscillating light source and the optical filter are packaged without active alignment on the same substrate. Accordingly, it is possible to realize an optical module in a simple and low-cost configuration by packaging the single-mode oscillating light source and the optical filter by passive alignment, without active alignment, on the same substrate, and by using a simple optical filter such as a waveguide ring resonator, which converts a frequency modulation to an amplitude modulation.

15 Claims, 8 Drawing Sheets

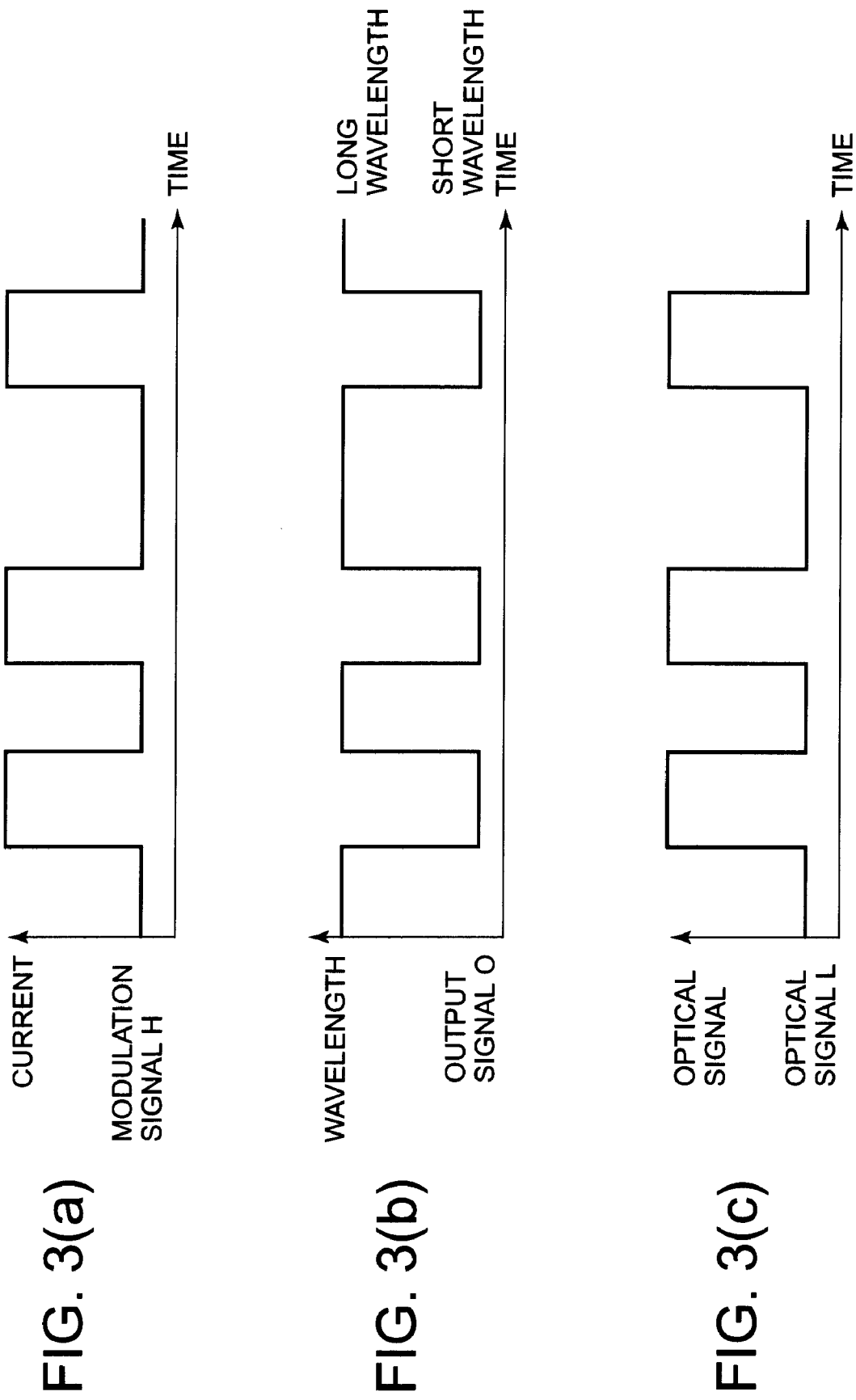

OPTICAL MODULE AND METHOD OF PACKAGING THE SAME

CROSS-REFERENCE TO RELATED APPLICATION

This application claims priority from Japanese Patent Application No. 2006-170388, filed on Jun. 20, 2006, in the Japanese Patent Office, the disclosure of which is hereby incorporated by reference in its entirety.

BACKGROUND

1. Field

Apparatuses and manufacturing methods consistent with the present invention relate to an optical module for a high-speed and large-volume optical communications system, and to a method of packaging the same.

2. Description of the Related Art

Along with the spread of the Internet, the development of a high-speed and large-volume optical communication system has been achieved. Especially in a long-distance and large-volume communications system, efforts have been made to reduce wavelength fluctuation (hereinafter referred to as "wavelength chirping"), which occurs during modulation, because such wavelength chirping limits the transmission distance. A frequency pulse laser (FP laser) of end-surface light emission type is used for short-distance and small-volume communication, and a distributed feed back laser (DFB laser) which oscillates in a single-mode is used for communication with a speed of several Gigabits per second (Gb/s). Generally, in a case of a transmission for a distance of tens of kilometers with a transmission speed of 10 Gb/s, the laser is not directly modulated, but the laser is caused to oscillate continuously. And the modulation is performed by use of an external modulator.

In an optical module disclosed in the U.S. Pat. No. 6,963,685, light from a directly modulated DFB laser is passed through an optical filter and, thus, converts a frequency modulation component to an amplitude modulation component. This optical module equalizes waveforms by the additional use of wavelength dispersion of the filter. However, the optical module as described in this related art requires its optical axis to be adjusted when the DFB laser and the optical filter are packaged in the optical module. This does not allow passive alignment to be applied to the structure of the optical module. Without such passive alignment, the cost and the time for manufacturing the module will increase.

The U.S. Patent Application Publication No. 2005/0175356 discloses that a waveguide ring resonator is used as the optical filter. However, the optical module as shown in this related art also requires improvement of the structure for packaging the DFB laser and the optical filter as in the case of the optical module in the previous related art, U.S. Pat. No. 6,963,685.

In a case of an optical module as shown in "Chirp-managed Directly Modulated Laser (CML)", *IEEE Photonics Technology Letters*, Vol. 18, No. 2, Jan. 15, 2006, using an optical filter which has periodical wavelength characteristics by using a multiple etalon is disclosed. And thus, a frequency modulation signal is converted to an amplitude modulation signal by using a slope of this optical filter. However, the use of the etalons as an optical filter requires the optical axis to be adjusted. And, this does not allow passive alignment to be applied to the structure of the optical module.

An optical module shown in "Error-free 250 Km transmission in standard fiber using compact 10 Gb/s chirp-managed directly modulated lasers (CML) at 1550 nm", *Electronics Letters*, 28 Apr. 2005, Vol. 41, No. 9, realizes a 250 Km transmission by extending the transmission distance of the optical module as shown in previous related art, "Chirp-managed Directly Modulated Laser (CML)". However, this optical module is too large to meet the requirement of miniaturization of the module. This is because etalons are used as a filter of the optical module.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide an optical module and a method of packaging the optical module, which enables long-distance and large-volume communications by using a simple configuration.

According to an aspect of the present invention, an optical module is configured with a combination of a single-mode oscillating light source and an optical filter. In this optical module, the single-mode oscillating light source outputs a single-mode, frequency-modulated signal. And, the optical filter converts the frequency modulation to an amplitude modulation. And, the single-mode oscillating light source and the optical filter are packaged without active alignment (i.e. without core alignment) on the same substrate.

The single-mode oscillating light source and the optical filter may be packaged by passive alignment. Or, the single-mode oscillating light source and the optical filter may be optically coupled to each other directly, or with a lens between them.

Furthermore, the single-mode oscillating light source may be a DFB laser, and the DFB laser may be biased by an electrical current value larger than a threshold, and may be modulated depending on a modulation signal. And, the optical filter may be a waveguide ring resonator, and the wavelength ring resonator may convert an oscillation wavelength shift of the DFB laser to an intensity modulation.

Furthermore, the ring resonator may convert the oscillation wavelength shift to the intensity modulation by using a thru port, which has the characteristics of a notch filter or a band-pass filter. And, the optical filter may comprise a plurality of waveguide ring resonators which are optically coupled to one another. Further, the optical filter may comprise a circuit configuration with an asymmetrical Mach-Zehnder Interferometer (MZI).

According to an another aspect of the present invention, a method of packaging an optical module comprises packaging, on the same substrate, a single-mode oscillating light source which outputs a frequency-modulated signal, and an optical filter which converts the frequency modulation to an amplitude modulation without active alignment.

In addition, according to another aspect of the present invention, the packaging of the single-mode oscillating light source and the optical filter may be performed by passive alignment.

According to exemplary embodiments of the present invention, it is possible to realize an optical module in a simple and low-cost configuration by packaging the single-mode oscillating light source and the optical filter by passive alignment without active alignment. Further, by using an optical filter such as a waveguide ring resonator, which converts a frequency modulation to an amplitude modulation, it is possible to realize an optical module in a simple and low-cost configuration. This is because the waveguide ring resonator is much cheaper and smaller than generally used expensive and bulky modulators such as a LiNbO$_3$ (LN) modulator. Further, by using an optical filter such as the waveguide ring resonator, optical signals whose wavelength chirping is low can be obtained. And, these characteristics are suitable for long-distance and large-volume optical communication.

BRIEF DESCRIPTION OF THE DRAWINGS

The above and other aspects of the present invention will become more apparent by describing in detail exemplary embodiments thereof with reference to the accompanying drawings, in which:

FIGS. 3(*a*), 3(*b*) and 3(*c*) are diagrams showing signal waveforms according to an exemplary embodiment of the present invention.

DETAILED DESCRIPTION OF EXEMPLARY EMBODIMENTS

Exemplary embodiments of the invention will now be described below with reference to the attached Figures. The described exemplary embodiments are intended to assist the understanding of the invention, and are not intended to limit the scope of the invention in any way.

Figure 1:
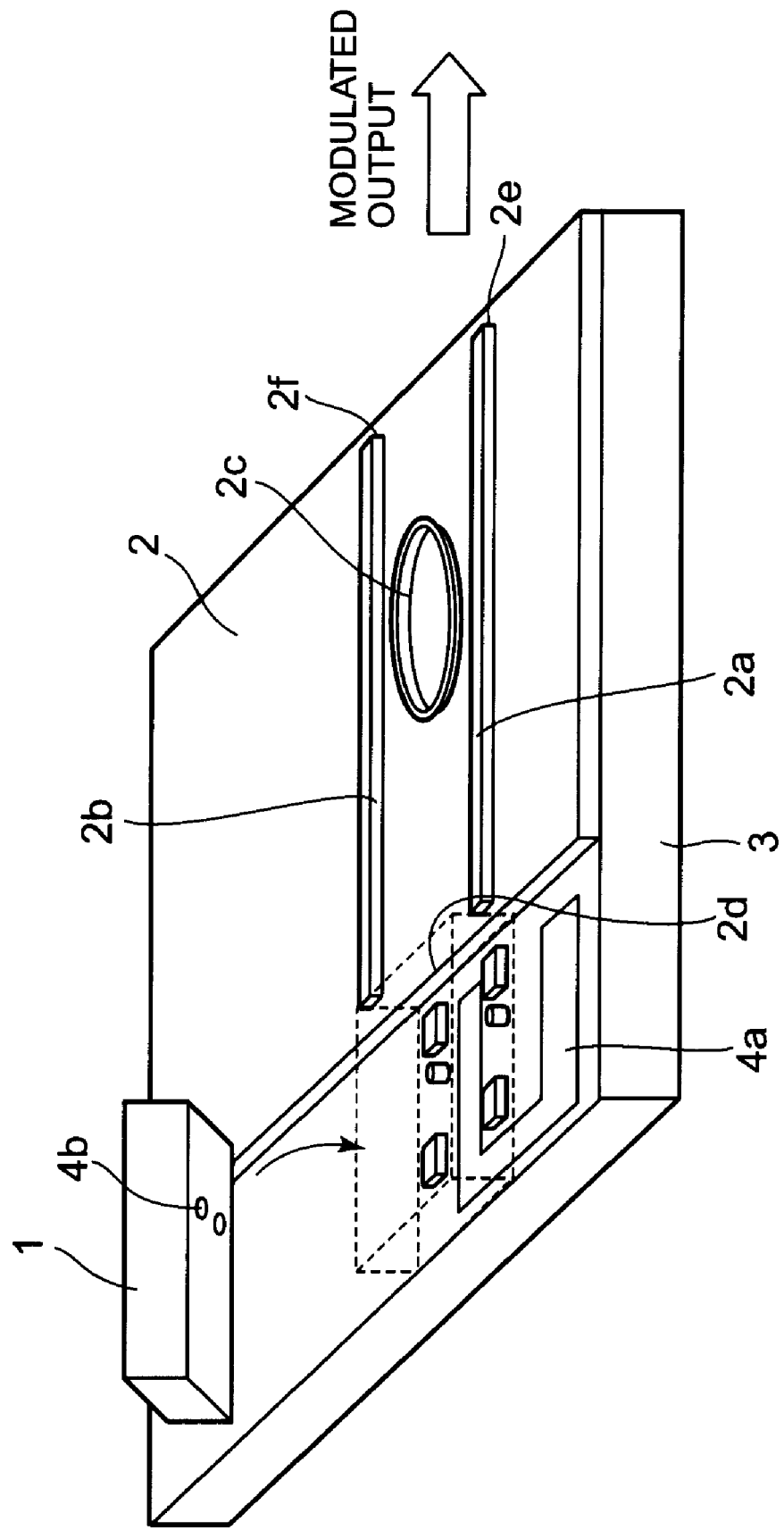
FIG. 1 is a perspective view showing an optical module according to an exemplary embodiment of the present invention.

FIG. 1 is a perspective view showing an optical module according to an exemplary embodiment of the present invention.

FIG. 1 shows that a DFB laser 1 capable of a high-speed modulation which is used as a single-mode oscillating light source, and a waveguide ring resonator 2 which is used as an optical filter are packaged without active alignment on the same substrate 3.

That is, the DFB laser 1 and the waveguide ring resonator 2 are packaged by passive alignment on the same substrate 3 (the package of this type is also termed as a "flip-chip package"). The passive alignment technique is carried out as follows. First, alignment markers 4*a* and 4*b* are provided on the substrate 3 and the DFB laser 1, respectively. Subsequently, light for alignment, such as infrared light, is transmitted from the bottom surface of the substrate 3 to the alignment markers 4*a* and 4*b*. Thus, the DFB laser 1 is positioned to the top of the substrate 3 by using the alignment markers 4*a* and 4*b*. Thereby, the DFB laser 1 and the waveguide ring resonator 2 are packaged without active alignment on the substrate 3. Temperatures of the DFB laser 1 and the waveguide ring resonator 2 are controlled, respectively. Thus, the operations of the laser and resonator are stabilized. The temperature control means may be, for example, a peltier element or a heater.

The waveguide ring resonator 2 is configured of two linear waveguides 2*a* and 2*b* and a ring-shaped waveguide 2*c*, as shown in FIG. 1. The two linear waveguides 2*a* and 2*b* and the ring-shaped waveguide 2*c* are optically coupled to each other. With regard to the waveguide ring resonator 2, an input port 2*d* is formed at one end terminal of the linear waveguide 2*a*. And, a thru port 2*e* for output is formed at the other end terminal of the linear waveguide 2*a*. And, a drop port 2*f* for output is formed at an end terminal of the linear waveguide 2*b*.

Figure 2A:
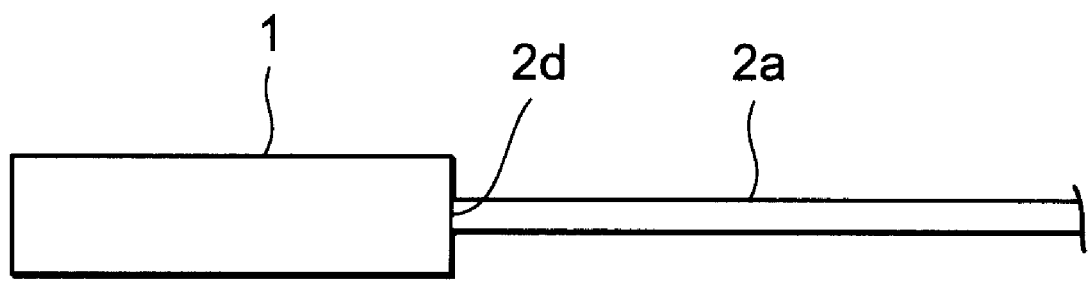
FIGS. 2(*a*) and 2(*b*) are diagrams showing how a single-mode oscillating light source and an optical filter are coupled to each other according to an exemplary embodiment of the present invention.
Figure 2B:
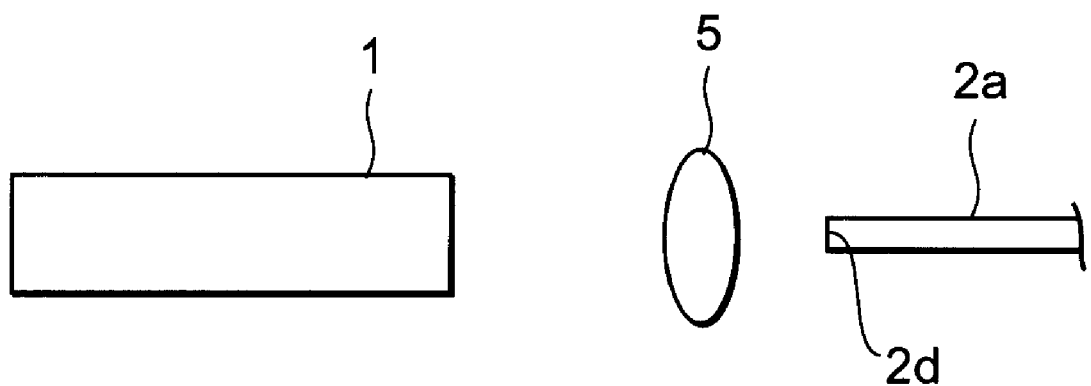

An output port of the DFB laser 1 and an input port 2*d* of the waveguide ring resonator 2 are optically coupled to each other as shown in FIG. 2(*a*). Or, the output port of the DFB laser 1 and the input port 2*d* of the waveguide ring resonator 2 are optically coupled to each other with a lens 5 between them, as shown in FIG. 2(*b*).

The operational principle of an optical module according to an exemplary embodiment of the present invention is as follows.

The DFB laser 1 is biased by an electrical current sufficiently higher than a threshold electrical current. And, the electrical current is modulated depending on a modulation signal. According to an exemplary embodiment of the present invention, this operation is carried out in a condition where even the smallest amplitude of the electrical current is not lower than a threshold electrical current, and light outputted from the DFB laser 1 is always sufficiently obtained.

In FIG. 3, a modulation signal H for modulating the electrical current applied to the DFB laser 1 is shaped into a substantially rectangular waveform, as shown in FIG. 3 (*a*). Then, the DFB laser 1 is modulated by the electrical current based on the modulation signal H. And, thereby, the oscillation wavelength of the DFB laser 1 shifts. An output signal 0 from the DFB laser 1, whose oscillation wavelength has been shifted, is shaped into a substantially rectangle form, as shown in FIG. 3(*b*).

Subsequently, the waveguide ring resonator 2 converts the oscillation wavelength shift of the DFB laser 1 to an intensity amplitude variation. By this method, even though the modulation method is a simple electrical current modulation, it enables long-distance and large-volume optical communications. That is, according to an exemplary embodiment of the present invention, because the electrical current value is sufficiently higher than a threshold electrical current, and because the modulation current amplitude variation is small, the dispersion characteristic becomes better. Thus, the wavelength chirping of the signal becomes small.

Figure 4:
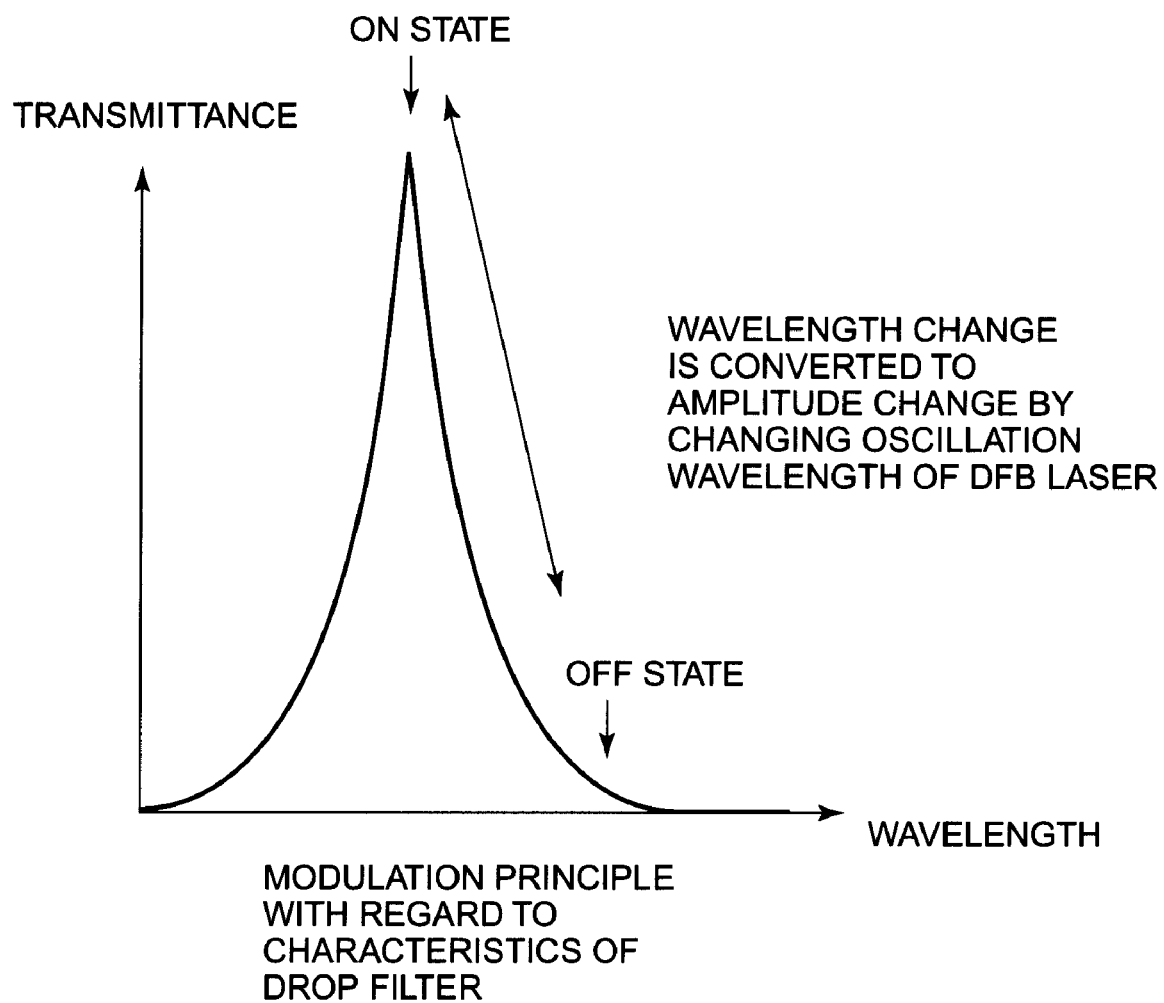
FIG. 4 is a diagram showing a modulation principle with respect to characteristics of a drop filter.
Figure 5:
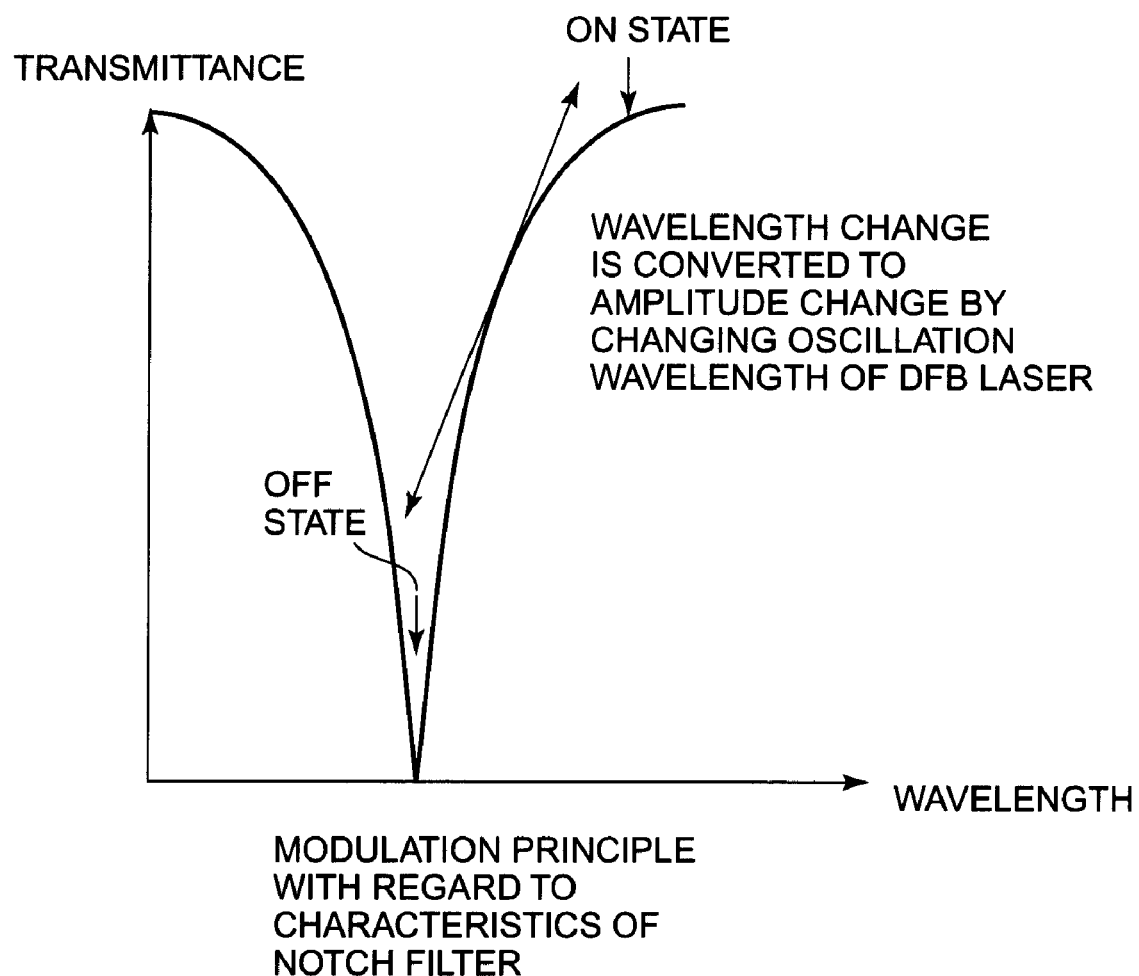
FIG. 5 is a diagram showing a modulation principle with respect to characteristics of a notch filter.

The waveguide ring resonator 2 outputs optical signals from the thru port 2*e* and the drop port 2*f* respectively, in response to an input, as shown in FIG. 1. The wavelength characteristics from the thru port 2*e* are different from wavelength characteristics from the drop port 2*f*. The output from the thru port 2*e* has periodical wavelength characteristic of a notch filter. The output from the drop port 2*f* has periodical wavelength characteristic of a band-pass filter. The oscillation wavelength shift can be converted to the intensity amplitude by using a slope of the wavelength characteristic of any one of the two ports (hereinafter, this conversion is referred to as a "FM-AM conversion), as shown in FIG. 4 and FIG. 5. According to this exemplary embodiment of the present invention, the oscillation wavelength shift is converted to the intensity amplitude at high speed by using the thru port 2e with the wavelength characteristic of the notch filter.

FIG. 5 shows characteristics of the notch filter output from the thru port 2e of the waveguide ring resonator 2. According to an exemplary embodiment of the present invention, the higher value point of the transmittance in the notch filter's characteristic is to be an "ON state". And, the lower value point of the transmittance in the notch filter's characteristic is to be an "OFF state". That is, an exemplary embodiment of the present invention uses a sharp slope portion of the notch filter's characteristics from the higher value point to the lower value point. Thus, the oscillation wavelength shift of the DFB laser can be converted to the intensity amplitude by using this sharp slope portion of the notch filter's characteristics. Thereby, the wavelength change (frequency modulation) is converted to an amplitude change (intensity modulation). In FIG. 5, the filter is turned off in a case where the transmittance decreases. The frequency is modulated through current modulation, as described above. Accordingly, an optical signal L having a low wavelength chirping, which is suitable for long-distance and large-volume communication, is obtained (see FIG. 3(c)).

The frequency modulation may also be converted to the intensity modulation by using the characteristics of the band-pass filter (drop filter) outputted from the drop port 2f of the waveguide ring resonator 2, as shown in FIG. 4. The characteristics of the drop filter shown in FIG. 4 have an inverse relationship with the characteristics of the notch filter shown in FIG. 5. The drop filter is turned on where the transmittance becomes a higher value. Thus, the oscillation wavelength of the DFB laser is changed by using a sharp slope portion changing from the higher value to the lower value. Thereby, the wavelength change (frequency modulation) is converted to the amplitude change (intensity modulation).

According to exemplary embodiments of the present invention, it is possible to realize an optical module in a simple and low-cost configuration by using an optical filter such as a waveguide ring resonator which converts a frequency modulation to an amplitude modulation. This is because the waveguide ring resonator is much cheaper and smaller than generally used expensive and bulky modulators such as a LiNbO₃ (LN) modulator. Further, by adopting the above configuration, the optical module can generate optical signals whose wavelength chirping is low. And, this characteristic is suitable for long-distance and large-volume optical communication.

In addition, according to exemplary embodiments of the present invention, it is possible to realize an optical module with a simple configuration, by using the wavelength characteristics of the notch filter of the waveguide ring resonator 2.

Figure 6:
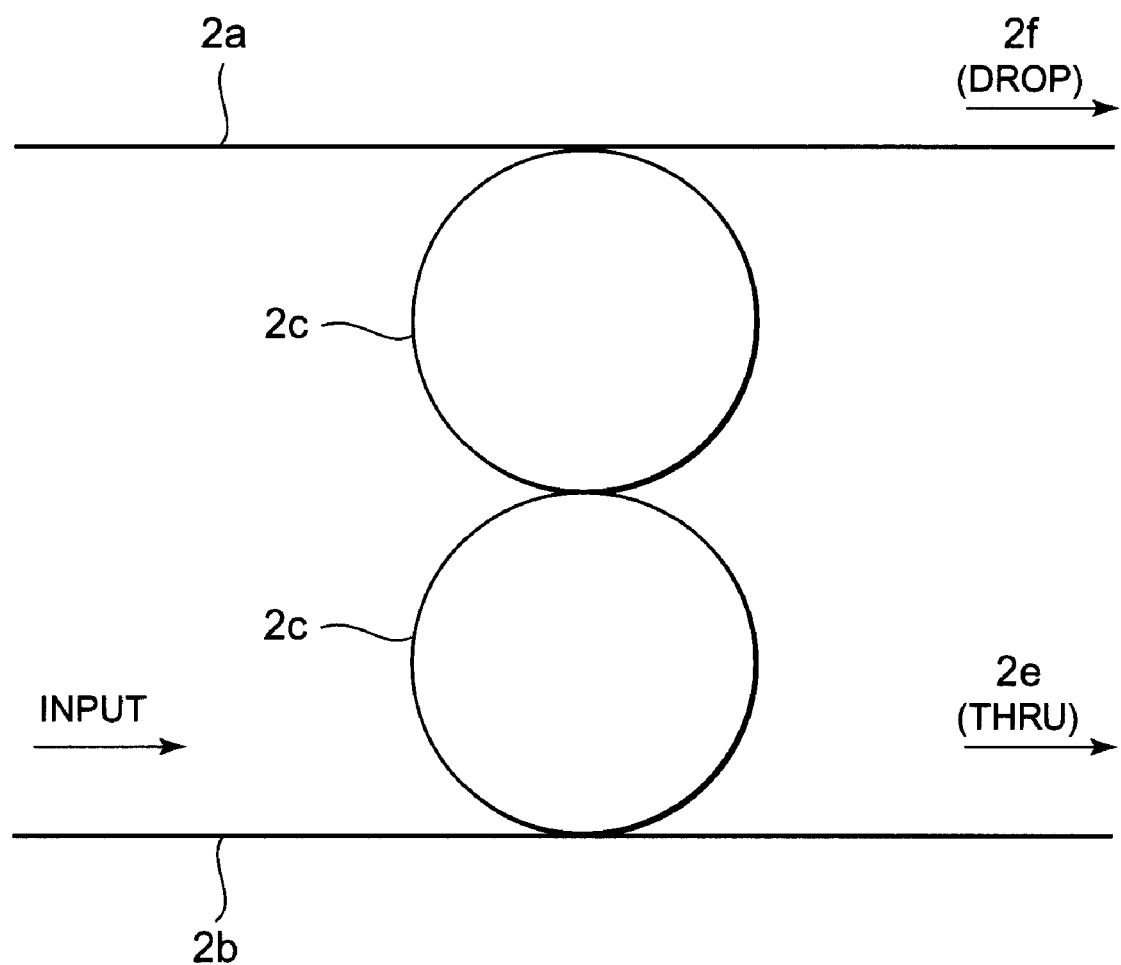
FIG. 6 is a view showing an optical module according to an exemplary embodiment of the present invention.

FIG. 6 shows another exemplary embodiment of the present invention.

According to this exemplary embodiment, two ring-shaped resonators 2c are optically coupled to each other between linear waveguides 2a and 2b facing each other. The other configuration is substantially the same as mentioned above.

By controlling parameters in a plurality of ring-shaped waveguides 2c, it is possible to shape the waveform of the optical signal L outputted from the waveguide ring resonator 2 into steep forms, i.e. sharp pulsed form.

Figure 7:
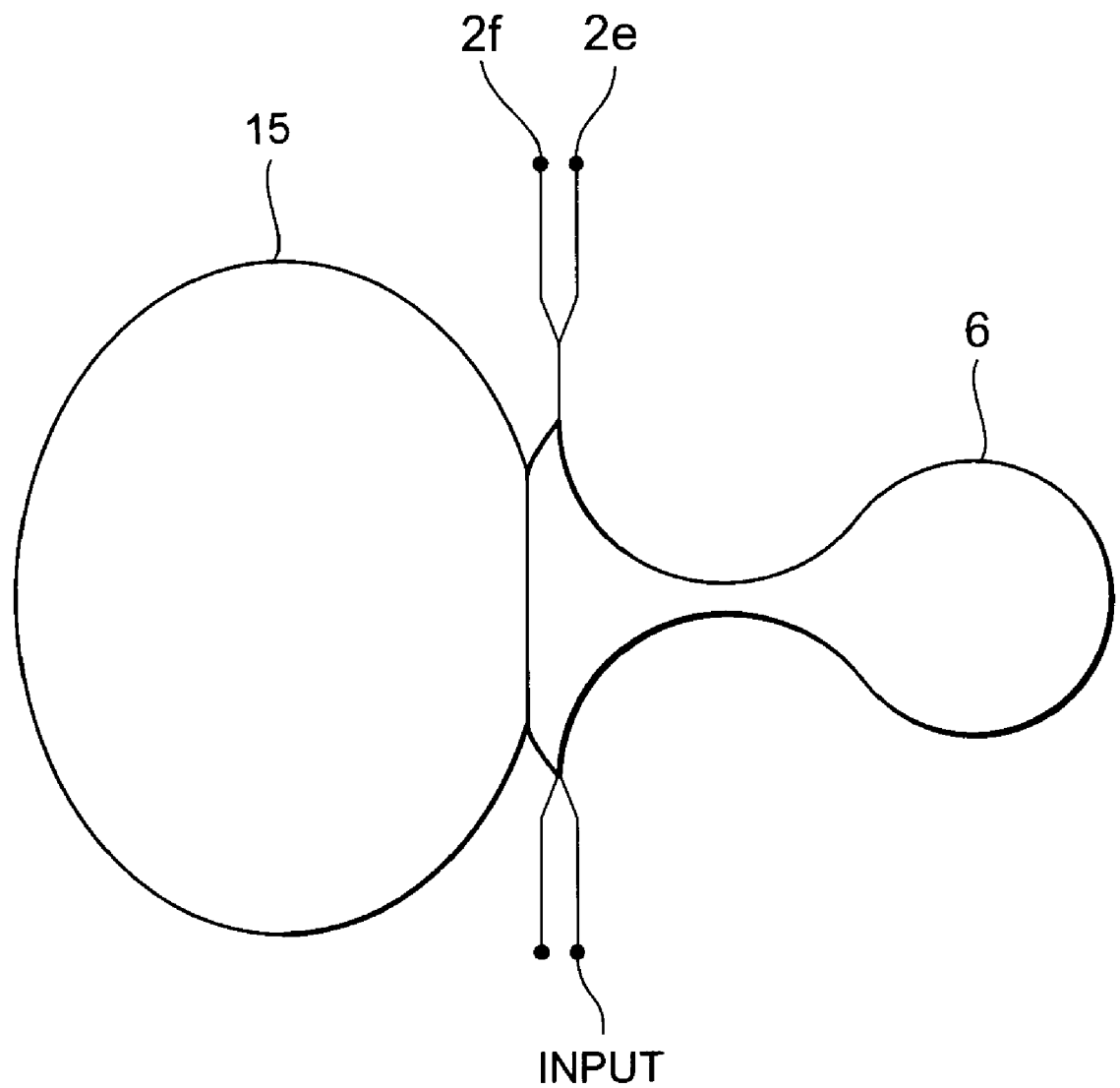
FIG. 7 is a view showing an optical module according to an exemplary embodiment of the present invention.
Figure 8:
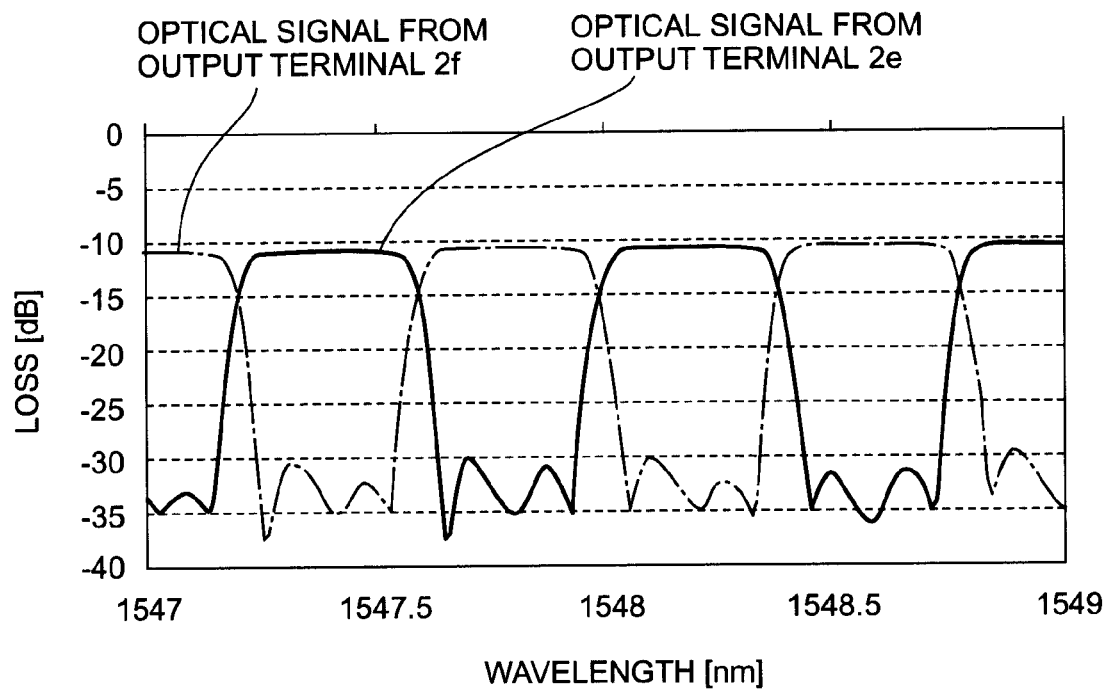
FIG. 8 is a diagram showing optical signals outputted according to an exemplary embodiment of the present invention.

FIG. 7 shows another aspect of the exemplary embodiment of the present invention.

According to this exemplary embodiment, the ring resonator 6 is formed in one of the two arms of a Mach-Zehnder interferometer (MZI) 15, and thus an optical circuit of an asymmetrical MZI is formed.

Figure 9:
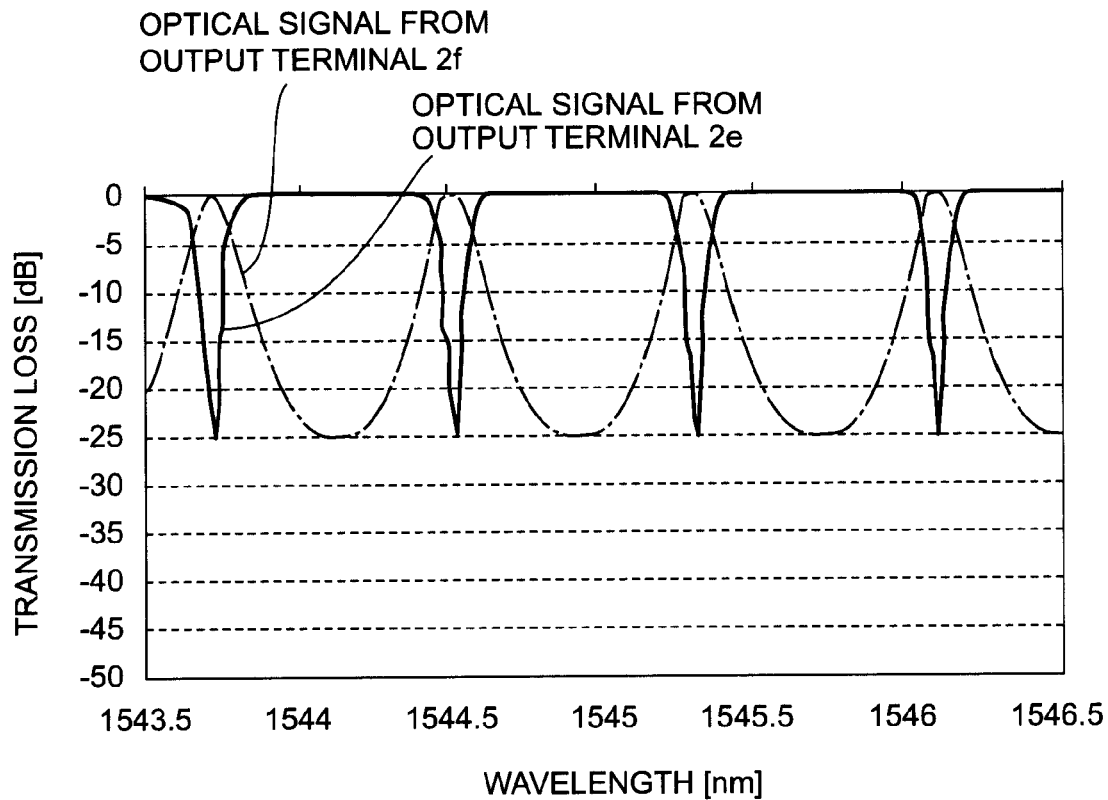
FIG. 9 is a diagram showing optical signals based on a result of calculating optical spectra according to an exemplary embodiment of the present invention.

According to this exemplary embodiment, by performing the conversion by using the configuration of the optical circuit as shown in FIG. 5, it is possible to remove one of the modulated sidebands. This is because low-loss and flat-transmittance characteristics can be obtained according to this exemplary embodiment. This makes it possible to constrict the modulation spectra, and an optical signal L having resistance to the wavelength dispersion is obtained. This optical signal L can be substantially the same as an ideal result as shown in FIG. 9, which is obtained through calculation of optical spectra.

While exemplary embodiments of the present invention have been described above, it is to be understood that numerous modifications to the exemplary embodiments of the invention will be apparent to those skilled in the art without departing from the spirit and scope of the present invention, as defined by the following claims and their legal equivalents.

What is claimed is:

1. An optical module comprising:
   a substrate;
   a single-mode oscillating light source, which outputs a frequency-modulated signal; and
   an optical filter, which converts said frequency-modulated signal to an amplitude-modulated signal;
   wherein said single-mode oscillating light source and said optical filter are optically coupled by passive alignment;
   wherein said optical filter comprises a ring resonator formed in one of two arms of an asymmetrical Mach-Zehnder interferometer, and
   wherein the asymmetrical Mach-Zehnder interferometer has two light propagation paths whose lengths are different from each other.

2. The optical module according to claim 1, wherein said single-mode oscillating light source and said optical filter are coupled using alignment markers.

3. The optical module according to claim 1, wherein said single-mode oscillating light source and said optical filter have one or more alignment markers, respectively.

4. The optical module according to claim 1, wherein said single-mode oscillating light source and said optical filter are optically coupled to each other with a lens disposed between them.

5. The optical module according to claim 1, wherein said single-mode oscillating light source comprises a distributed feed back laser.

6. The optical module according to claim 1, wherein said waveguide ring resonator exhibits characteristics similar to a notch filter.

7. The optical module according to claim 1, wherein said waveguide ring resonator exhibits characteristics similar to a band-pass filter.

8. A method of manufacturing an optical module comprising:
   positioning a single-mode oscillating light source, which outputs a frequency-modulated signal, on a substrate;
   positioning an optical filter, which converts said frequency-modulated signal to an amplitude-modulated signal, on said substrate; and
   coupling said single-mode oscillating light source and said optical filter without using active alignment;
   wherein said optical filter comprises a ring resonator formed in one of two arms of an asymmetrical Mach-Zehnder interferometer, and
   wherein the asymmetrical Mach-Zehnder interferometer has two light propagation paths whose lengths are different from each other.

9. The method of manufacturing an optical module according to claim 8, wherein said coupling is performed by passive alignment.

10. The method of manufacturing an optical module according to claim 9, wherein said single-mode oscillating light source and said optical filter have one or more alignment markers, respectively.

11. The method of manufacturing an optical module according to claim 9, wherein said passive alignment is performed by using alignment markers.

12. The method of manufacturing an optical module according to claim 8, further comprising coupling said single-mode oscillating light source and said optical filter by using a lens disposed between them.

13. The method of manufacturing an optical module according to claim 8, wherein said single-mode oscillating light source comprises a distributed feed back laser.

14. The method of manufacturing an optical module according to claim 8, wherein said waveguide ring resonator exhibits characteristics similar to a notch filter.

15. The optical module according to claim 8, wherein said waveguide ring resonator exhibits characteristics similar to a band-pass filter.

* * * * *